United States Patent
Takahashi et al.

(10) Patent No.: US 10,843,544 B2
(45) Date of Patent: Nov. 24, 2020

(54) SEALING STRUCTURE FOR OPENABLE ROOF-EQUIPPED VEHICLE

(71) Applicants: MAZDA MOTOR CORPORATION, Hiroshima (JP); Nishikawa Rubber Co., Ltd., Hiroshima (JP)

(72) Inventors: Tomoki Takahashi, Hiroshima (JP); Miwa Shinohara, Hatsukaichi (JP); Yoshihiko Horita, Higashihiroshima (JP); Tatsuo Koibuchi, Hiroshima (JP); Kazuaki Kikumitsu, Higashihiroshima (JP); Tomohiro Komaji, Higashihiroshima (JP); Sachi Matsui, Higashihiroshima (JP); Daisuke Nakazato, Hiroshima (JP); Akio Okayama, Hiroshima (JP)

(73) Assignees: MAZDA MOTOR CORPORATION, Hiroshima (JP); Nishikawa Rubber Co., Ltd., Hiroshima (JP)

(*) Notice: Subject to any disclaimer, the term of this patent is extended or adjusted under 35 U.S.C. 154(b) by 132 days.

(21) Appl. No.: 16/327,869

(22) PCT Filed: Oct. 2, 2017

(86) PCT No.: PCT/JP2017/035862
§ 371 (c)(1),
(2) Date: Feb. 25, 2019

(87) PCT Pub. No.: WO2018/070289
PCT Pub. Date: Apr. 19, 2018

(65) Prior Publication Data
US 2019/0193543 A1  Jun. 27, 2019

(30) Foreign Application Priority Data
Oct. 14, 2016 (JP) ................. 2016-202193

(51) Int. Cl.
*B60J 10/90* (2016.01)
*B60J 10/40* (2016.01)
(Continued)

(52) U.S. Cl.
CPC ............. *B60J 10/90* (2016.02); *B60J 7/12* (2013.01); *B60J 10/18* (2016.02); *B60J 10/40* (2016.02)

(58) Field of Classification Search
CPC ..... B60J 10/90; B60J 10/18; B60J 7/12; B60J 10/40
(Continued)

(56) References Cited

U.S. PATENT DOCUMENTS

2006/0261630 A1* 11/2006 Fleming .............. B60J 7/148
296/107.08
2007/0252405 A1* 11/2007 Uno ..................... B60J 10/90
296/107.04
(Continued)

FOREIGN PATENT DOCUMENTS

| JP | H10-315788 A | 12/1998 |
|----|--------------|---------|
| JP | 2010-241232 A | 10/2010 |

(Continued)

*Primary Examiner* — Pinel E Romain
(74) *Attorney, Agent, or Firm* — Studebaker & Brackett PC

(57) ABSTRACT

Corner portions of an upper edge of the rear-side roof 24 close to the side windows protrude toward a front of the vehicle beyond a rear frame portion of the associated side window. Pillars are positioned on the respective corner portions inside the vehicle. Weatherstrips 34 each include a lip portion 34*b* covering an upper end portion of the associated pillar from outside of the vehicle while the roof is closed. Sealing members 40 are respectively provided on the inside of the corner portions. An extended sealing portion 40*b* extends from each sealing member 40. The extended sealing portion 40*b* blocks a gap, formed between the
(Continued)

24···DECK COVER
24X···CORNER PORTION
31···PILLAR

20···RETRACTABLE ROOF
24···DECK COVER
24X···CORNER PORTION
33···RECESS
40···SEALING MEMBER
40b···EXTENDED SEALING PORTION associated corner portion and the associated pillar and intended for the lip portion 34b, while the front-side roof is open. The lip portion 34b of the weatherstrip 34 is sandwiched between the extended sealing portion 40b and the pillar while the roof is closed.

4 Claims, 13 Drawing Sheets

(51) Int. Cl.
  *B60J 10/18* (2016.01)
  *B60J 7/12* (2006.01)
(58) Field of Classification Search
  USPC .................................................. 296/107.04
  See application file for complete search history.

(56) References Cited

U.S. PATENT DOCUMENTS

| | | | | |
|---|---|---|---|---|
| 2008/0061582 | A1* | 3/2008 | Beierl | B60J 10/74 296/107.04 |
| 2012/0133174 | A1* | 5/2012 | Syvret | B60J 1/17 296/146.2 |

FOREIGN PATENT DOCUMENTS

| | | |
|---|---|---|
| JP | 2016-107853 A | 6/2016 |
| JP | 2016-107854 A | 6/2016 |
| JP | 2016-117404 A | 6/2016 |

\* cited by examiner

24···DECK COVER
24X···CORNER PORTION
31···PILLAR

7···SIDE WINDOW
20···RETRACTABLE ROOF
23···FRONT-SIDE ROOF
24···DECK COVER
24X···CORNER PORTION

FIG. 3
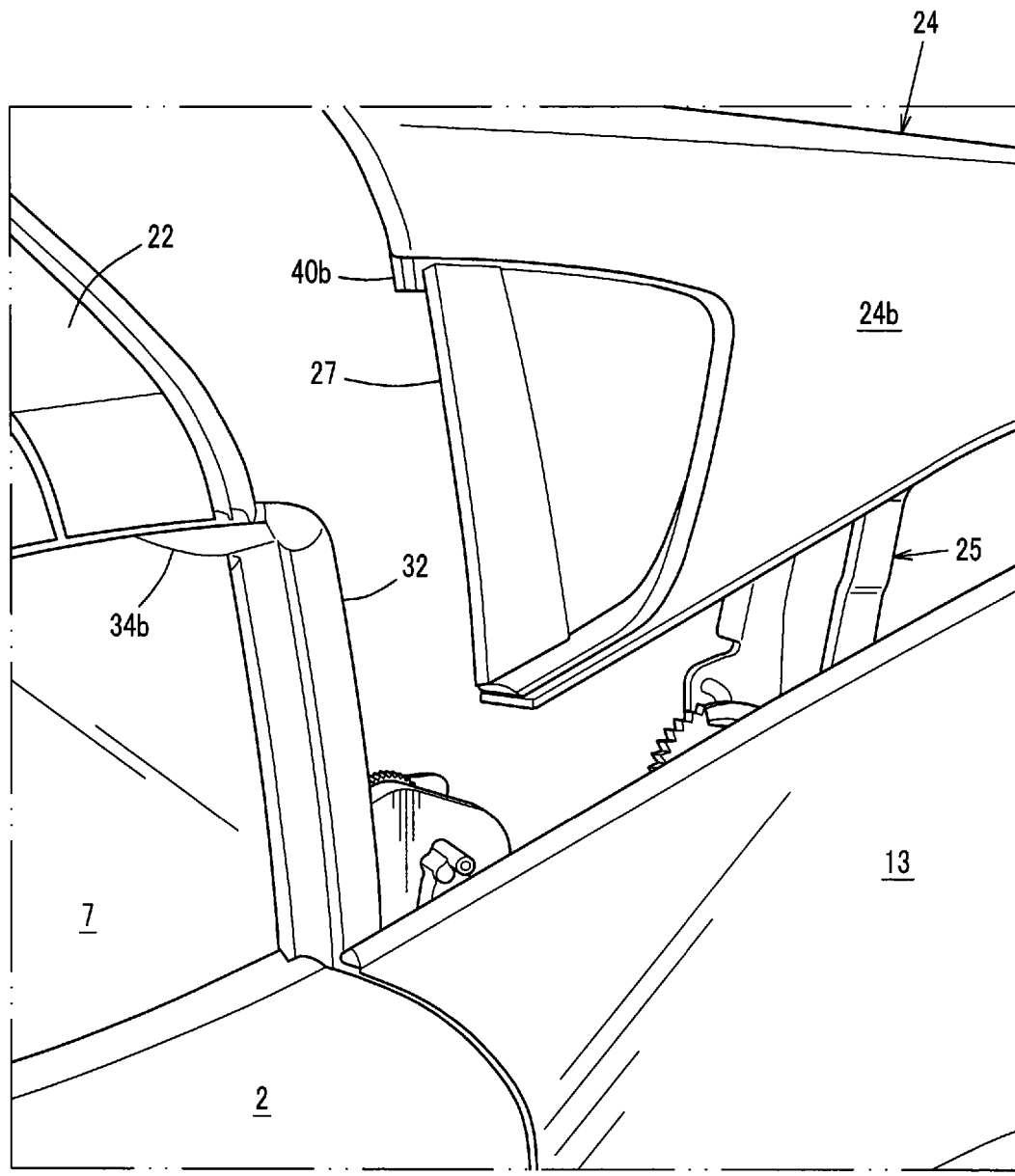
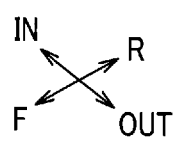
7···SIDE WINDOW
24···DECK COVER
34b···LIP PORTION
40b···EXTENDED SEALING PORTION

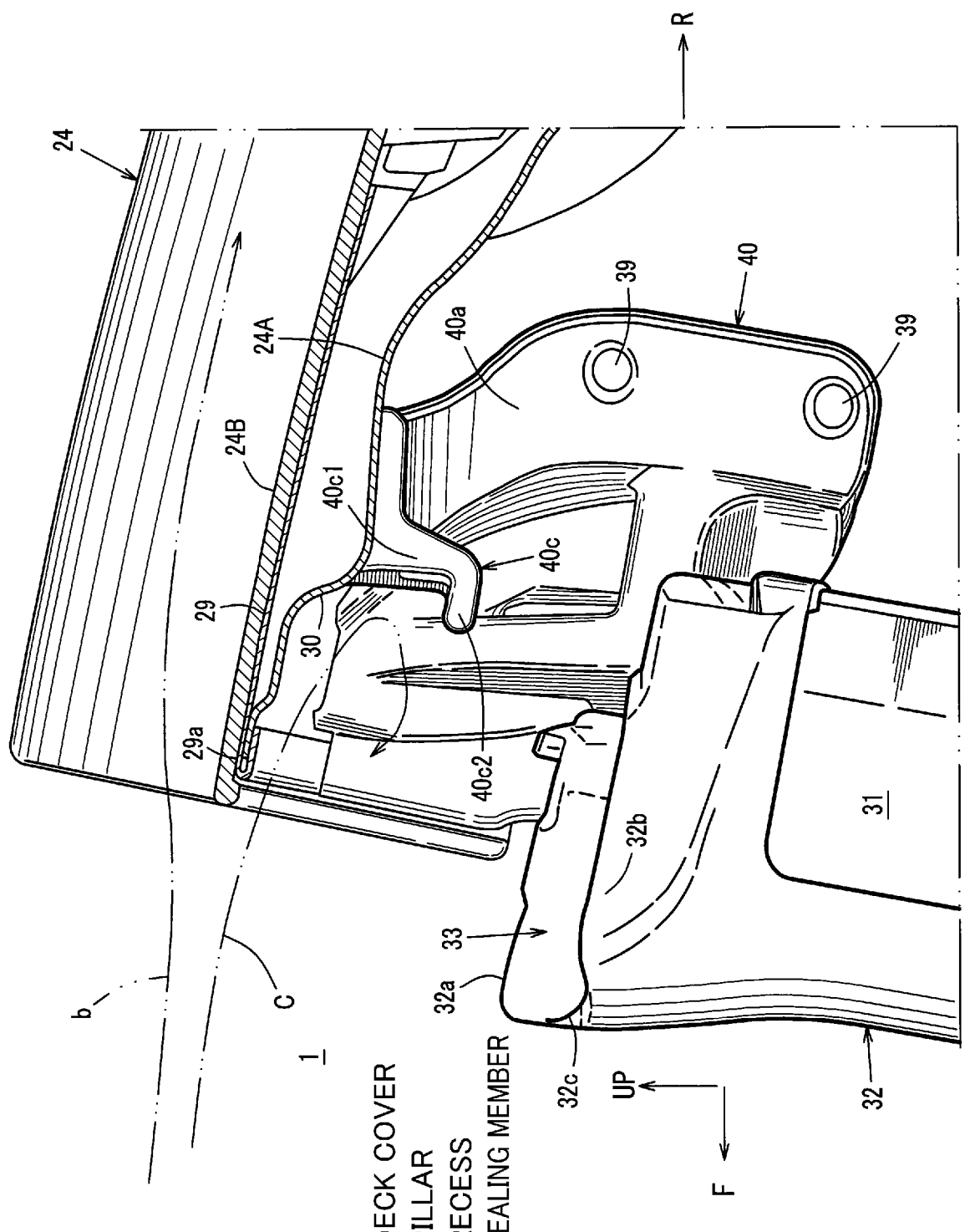

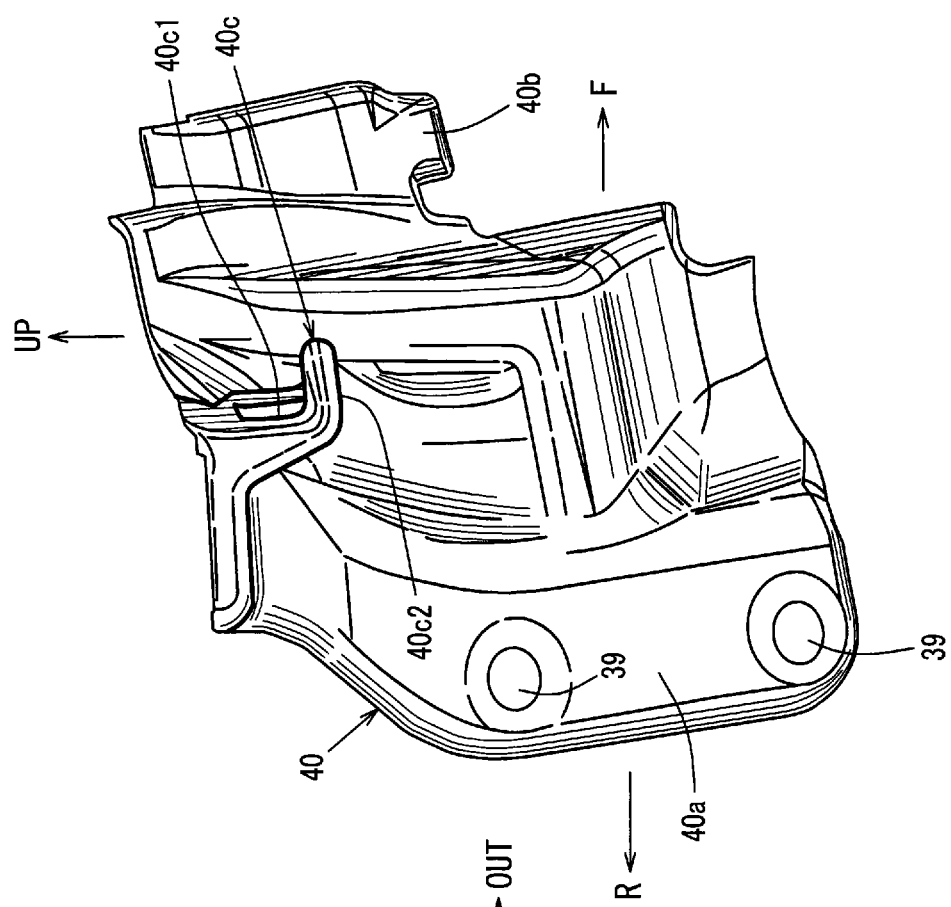
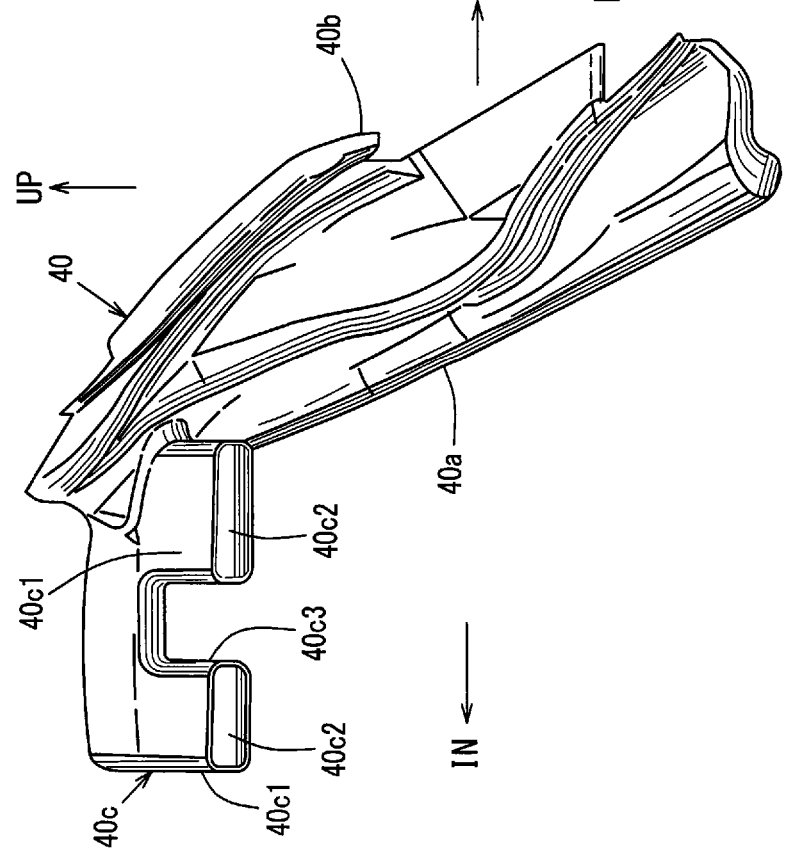
FIG. 13A
FIG. 13B
40··· SEALING MEMBER
40b··· EXTENDED SEALING PORTION

SEALING STRUCTURE FOR OPENABLE ROOF-EQUIPPED VEHICLE

TECHNICAL FIELD

The present invention relates to a sealing structure for a motor vehicle with a retractable roof including a front-side roof and a rear-side roof. The motor vehicle has a cabin that has its upper end opened and closed by the retractable roof.

BACKGROUND ART

Exemplary known retractable roofs described above include a retractable roof which includes a front roof and a middle roof as a front-side roof, and a deck cover as a rear-side roof, and which opens and closes an upper end of the vehicle cabin, as disclosed in Patent Document 1.

In general, the front-side roof is provided with a roof-side weatherstrip, and pillars of a vehicle body are each provided with a pillar-side weatherstrip.

When the retractable roof is to be closed, the pillar-side weatherstrip is pushed by a side window of an associated side door so that the roof-side weatherstrip is pushed inward in the vehicle width direction by the pillar-side weatherstrip. As a result, a gap is formed between the pillar-side weatherstrip and a front portion of the deck cover.

To prevent the formation of the gap, the roof-side weatherstrip may have a lip portion caught on an outer surface of the side window in the vehicle width direction. When the roof is to be closed, the lip portion may prevent the roof-side weatherstrip from being pushed inward in the vehicle width direction.

In this case, when the front roof and the middle roof are retracted, the lip portion is retracted in a storage compartment together with the front-side roof. Thus, the gap described above is left between the pillar-side weatherstrip and the front portion of the deck cover. Under the influence of travel wind having a relatively high velocity and a relatively low pressure against the inside of the deck cover, air is sucked out of the vehicle through the above-described gap, thereby generating noise (suction sound).

That is to say, air flowing rearward along the upper portion of the pillar is sucked out of the vehicle through the gap by an air stream flowing along a side surface of the vehicle body and having a higher velocity and a lower pressure than the air, thereby generating noise.

CITATION LIST

Patent Documents

PATENT DOCUMENT 1: Japanese Unexamined Patent Publication No. 2016-117404

SUMMARY OF THE INVENTION

Technical Problem

The present invention is thus intended to provide a sealing structure for a motor vehicle with a retractable roof, the sealing structure being capable of blocking the gap with a roof open and preventing wind suction sound, without hindering the sealing performance of a lip portion of the sealing structure while the roof and a side window are closed.

Solution to the Problem

A sealing structure for a motor vehicle with a retractable roof according to the present invention is directed to a sealing structure for a motor vehicle with a retractable roof including a front-side roof and a rear-side roof, the motor vehicle having a cabin that has an upper end opened and closed by the retractable roof. Side windows are provided in front of respective side surfaces of the rear-side roof. Corner portions of an upper edge of the rear-side roof close to the side windows each protrude toward a front of the vehicle beyond a rear frame portion of an associated one of the side windows. Pillars provided on a vehicle body are positioned on the respective corner portions inside the vehicle. Front-side roof-side weatherstrips attached to the front-side roof each include a lip portion, the lip portion being positioned to cover an upper end portion of an associated one of the pillars from outside of the vehicle while the roof is closed. Sealing members are respectively provided on the corner portions of the rear-side roof close to the side windows inside the vehicle. An extended sealing portion extends from each sealing member, the extended sealing portion blocking a gap while the front-side roof is open, the gap being formed between an associated one of the corner portions and an associated one of the pillars and intended for the lip portion. The extended sealing portion is positioned to sandwich the lip portion of the front-side roof-side weatherstrip between the extended sealing portion and the pillar while the roof is closed.

The front-side roof may include a front roof and a middle roof. The rear-side roof may include a deck cover. Further, a frame portion of each side window may be constructed of, for example, a roof, a front pillar, a center pillar, and a deck cover. The rear frame portion of the side window means a rear portion of the frame portion.

According to this configuration, the extended sealing portion is provided to block a major portion of the gap from the sealing member inside the vehicle. Thus, the extended sealing portion blocking the gap can prevent wind suction sound (noise) arising from the air stream flowing along a side surface of the vehicle body. In addition, the extended sealing portion extending from the inside of the vehicle pushes the lip portion from outside the vehicle while the roof is closed. This helps position the lip portion.

In one embodiment of the present invention, a trim strip may be provided on the rear frame portion of each of the side windows outside the vehicle, and a front end portion of the trim strip and a rear edge of the extended sealing portion may engage with each other while overlapping each other with the front end portion of the trim strip located inside the rear edge of the extended sealing portion.

According to this configuration, the extended sealing portion inside the vehicle and the trim strip outside the vehicle engage with each other while overlapping each other with the front end portion of the trim strip located inside the rear edge of the extended sealing portion. This can improve the persistence of the positioning accuracy without rigidifying the extended sealing portion, such as providing a core material in the extended sealing portion.

More specifically, even though the extended sealing portion and the trim strip are each formed of a flexible member, these flexible members, which have high durability in the tensile direction, pull each other toward the associated attachment region (an associated one of the inside and outside of the vehicle cabin), thereby improving the persistence of the positioning accuracy.

In one embodiment of the present invention, an upper portion of each of the pillars may have a recess receiving the retractable roof and extending in a longitudinal direction of the vehicle.

This configuration allows the recess to support the retractable roof on the upper portion of the pillar without misalignment, and can effectively prevent wind flowing in the direction of the gap along the recess (the pillar recess) from causing suction sound. That is to say, the retractable roof can be supported, and suction sound can be prevented.

Advantages of the Invention

According to the present invention, while the roof is open, the gap can be blocked, and wind suction sound can be prevented, without hindering the sealing performance of a lip portion while the roof and an associated side window are closed.

BRIEF DESCRIPTION OF THE DRAWINGS

FIG. 3 A perspective view of a region between a side window and an open deck cover and its surroundings.

FIG. 12 A side view showing an entering wind prevention structure on the right side of the vehicle.

FIG. 13A is a front view of a sealing member, and FIG. 13B is a right side view of the sealing member.

DESCRIPTION OF EMBODIMENTS

The objective of blocking a gap with a roof open and preventing wind suction sound, without hindering the sealing performance of a lip portion while the roof and a side window are closed is attained by the following features of a sealing structure for a motor vehicle with a retractable roof including a front-side roof and a rear-side roof, the motor vehicle having a cabin that has an upper end opened and closed by the retractable roof. Specifically, side windows are provided in front of respective side surfaces of the rear-side roof, corner portions of an upper edge of the rear-side roof close to the side windows each protrude toward a front of the vehicle beyond a rear frame portion of an associated one of the side windows, pillars provided on a vehicle body are positioned on the respective corner portions inside the vehicle, front-side roof-side weatherstrips attached to the front-side roof each include a lip portion, the lip portion being positioned to cover an upper end portion of an associated one of the pillars from outside of the vehicle while the roof is closed, sealing members are respectively provided on the corner portions of the rear-side roof close to the side windows inside the vehicle, an extended sealing portion extends from each sealing member, the extended sealing portion blocking a gap while the front-side roof is open, the gap being formed between an associated one of the corner portions and an associated one of the pillars and intended for the lip portion, and the extended sealing portion is positioned to sandwich the lip portion of the front-side roof-side weatherstrip between the extended sealing portion and the pillar while the roof is closed.

EMBODIMENT

An embodiment of the present invention will now be described with reference to the drawings.

Figure 1:
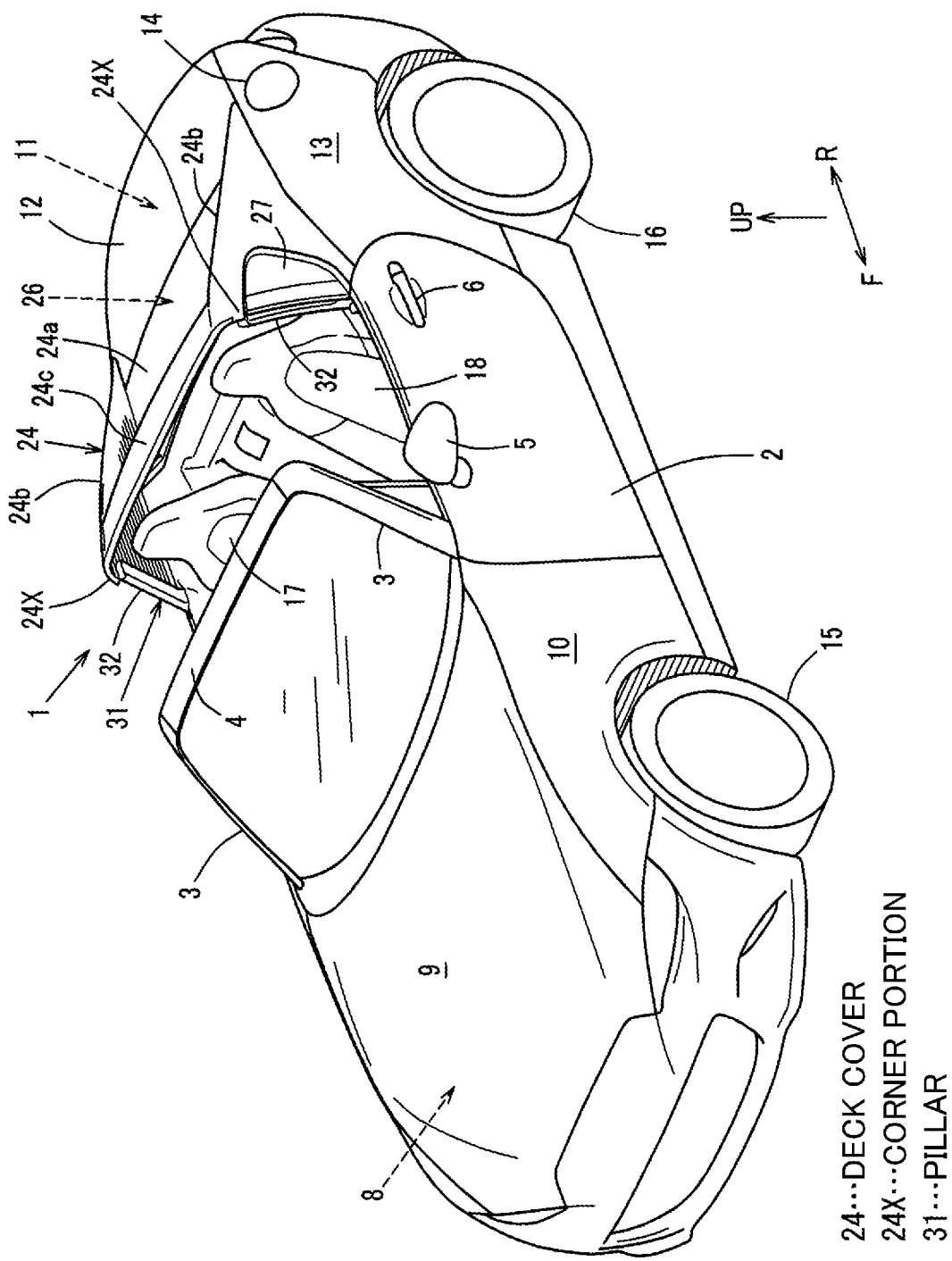
FIG. 1 A perspective view of a motor vehicle with a retractable roof including a sealing structure according to the present invention with the roof open.
Figure 2:
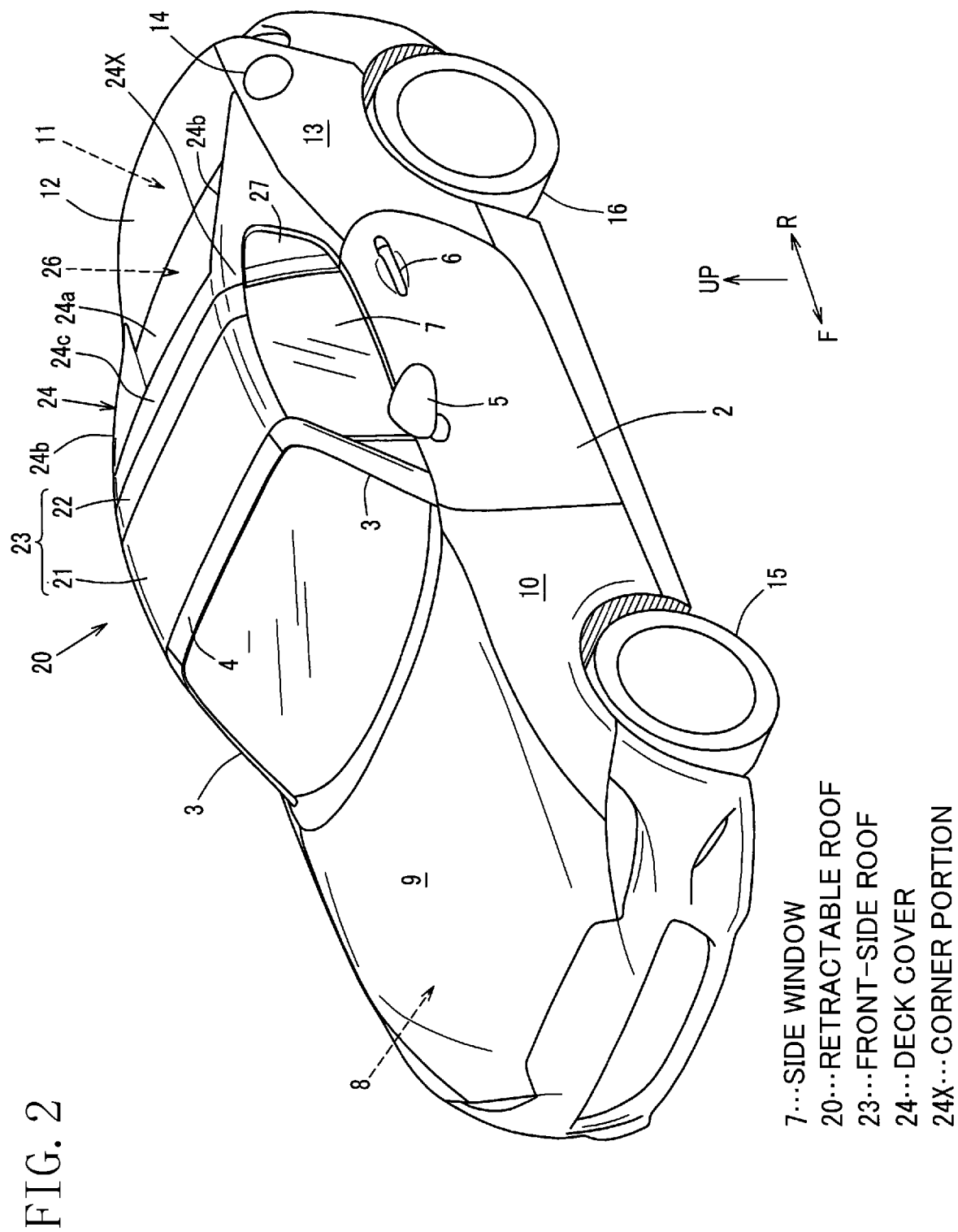
FIG. 2 A perspective view of the motor vehicle with the roof closed.
Figure 4:
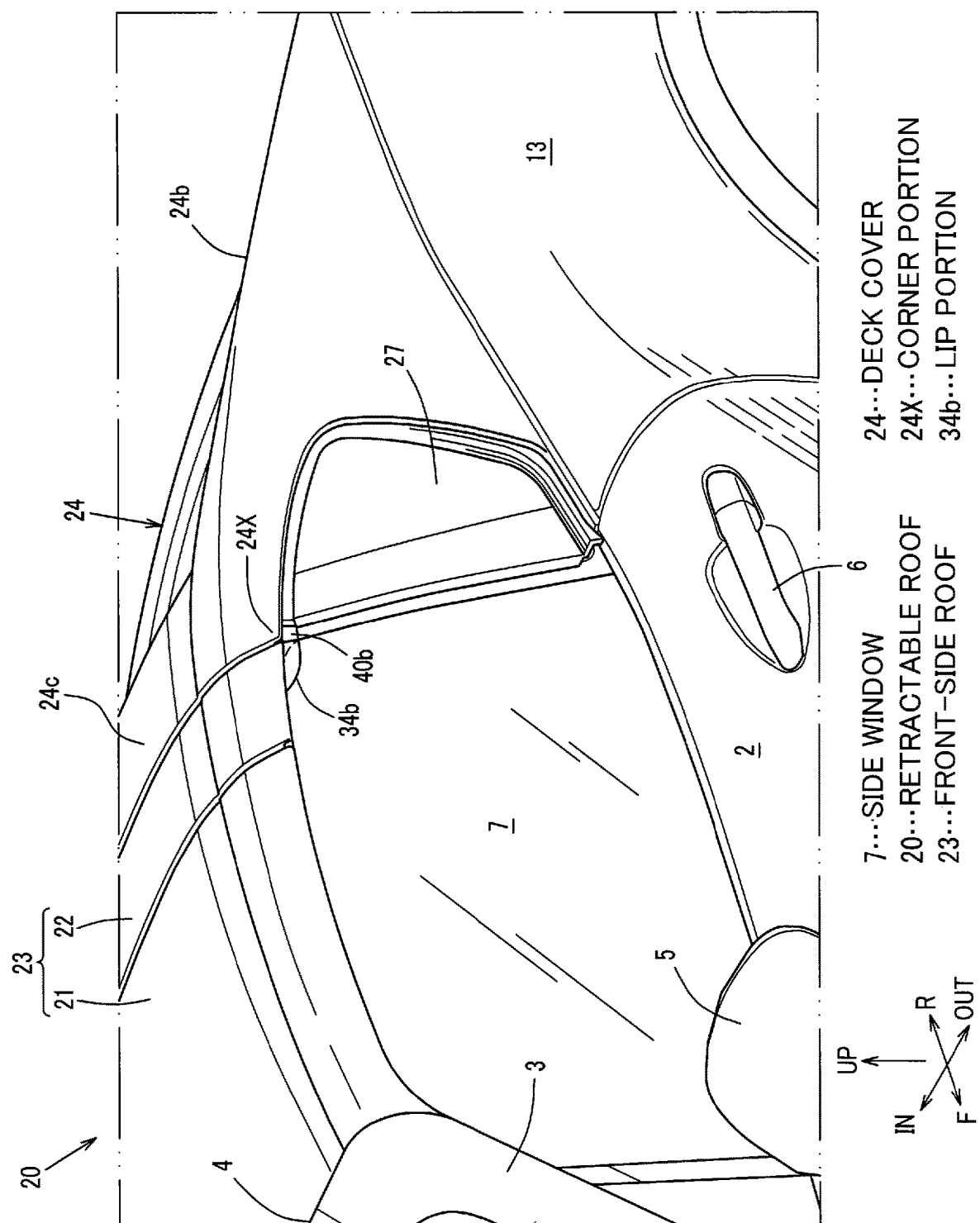
FIG. 4 An enlarged perspective view of an essential portion of FIG. 2.

The drawings illustrate a sealing structure for a motor vehicle with a retractable roof. FIG. 1 is a perspective view of the motor vehicle with the roof open. FIG. 2 is a perspective view of the motor vehicle with the roof closed. FIG. 3 is a perspective view of a region between a side window and an open deck cover and its surroundings. FIG. 4 is an enlarged perspective view of an essential portion of FIG. 2.

As illustrated in FIG. 1, the motor vehicle of this embodiment is a convertible having a vehicle cabin with an opening 1 through upper and lateral sides thereof.

In FIGS. 1 and 2, front pillars 3 are each provided on an upper end of an associated one of hinge pillars (not shown) that support respective side doors 2. The front pillars 3 each extend upward and rearward from the associated hinge pillar. The right and left front pillars 3 are provided in a pair. A front header 4 extending in the vehicle width direction is provided between upper end portions of the right and left front pillars 3, 3.

The side doors 2 each include a door mirror 5 and a door outer handle 6, and are each provided with a side window 7 (see FIG. 2) that can move upward and downward.

An upper portion of an engine compartment 8 in a front portion of the vehicle body is covered with a hood 9, and the right and left sides of the engine compartment 8 are covered with front fenders 10, respectively. On the other hand, an upper portion of a trunk space 11 in a rear portion of the vehicle body is covered with a trunk lid 12, and the right and left sides of the trunk space 11 are covered with rear fenders 13, respectively.

Note that reference numeral 14 denotes a fuel filler lid provided on one of the rear fenders 13, reference numeral 15 denotes front wheels, and reference numeral 16 denotes rear wheels. As illustrated in FIG. 1, seats 17, 18 for seating passengers are provided in the vehicle cabin. One of these seats 17, 18 is determined to be a driver's seat, and the other seat is determined to be a passenger's seat.

As illustrated in FIGS. 1 to 4, a front-side roof 23 including a front roof 21 and a middle roof 22 and a deck cover 24 serving as a rear-side roof form a retractable roof 20. The retractable roof 20 including the front-side roof 23 and the deck cover 24 is configured to open and close the upper end of the vehicle cabin.

The retractable roof 20 is opened and closed through a linkage 25 shown in FIG. 3. While the roof is closed, the front roof 21, the middle roof 22, and the deck cover 24 cover the upper end of the vehicle cabin as illustrated in FIG. 2. While the roof is open, the front roof 21 and the middle roof 22 are retracted in a storage compartment 26 provided in a rear portion of the vehicle body as illustrated in FIG. 1.

While the roof is closed as described above, the front roof 21 is detachably engaged with a corresponding portion of the front header 4 via a hook (not shown) provided in the middle of the front end of the front roof 21 in the vehicle width direction.

As illustrated in FIGS. 1 to 4, the deck cover 24 forms an outer surface of a portion of the vehicle between the vehicle cabin and the trunk space 11 when closed. The deck cover 24 includes a plate-like base portion 24a, right and left protruding portions 24b, and a header portion 24c, which are integrated together. The base portion 24a extends in the vehicle width direction, and blocks the storage compartment 26. The protruding portions 24b are provided on both sides of the base portion 24a in the vehicle width direction to each protrude from the base portion 24a to a height, which increases from its front end toward its rear end. The header portion 24c is bridged between the right and left protruding portions 24b and 24b in the vehicle width direction. A garnish 27 separate from the deck cover 24 is attached to an outer side surface of a front end portion of each protruding portion 24b through a clip (not shown).

Figure 5:
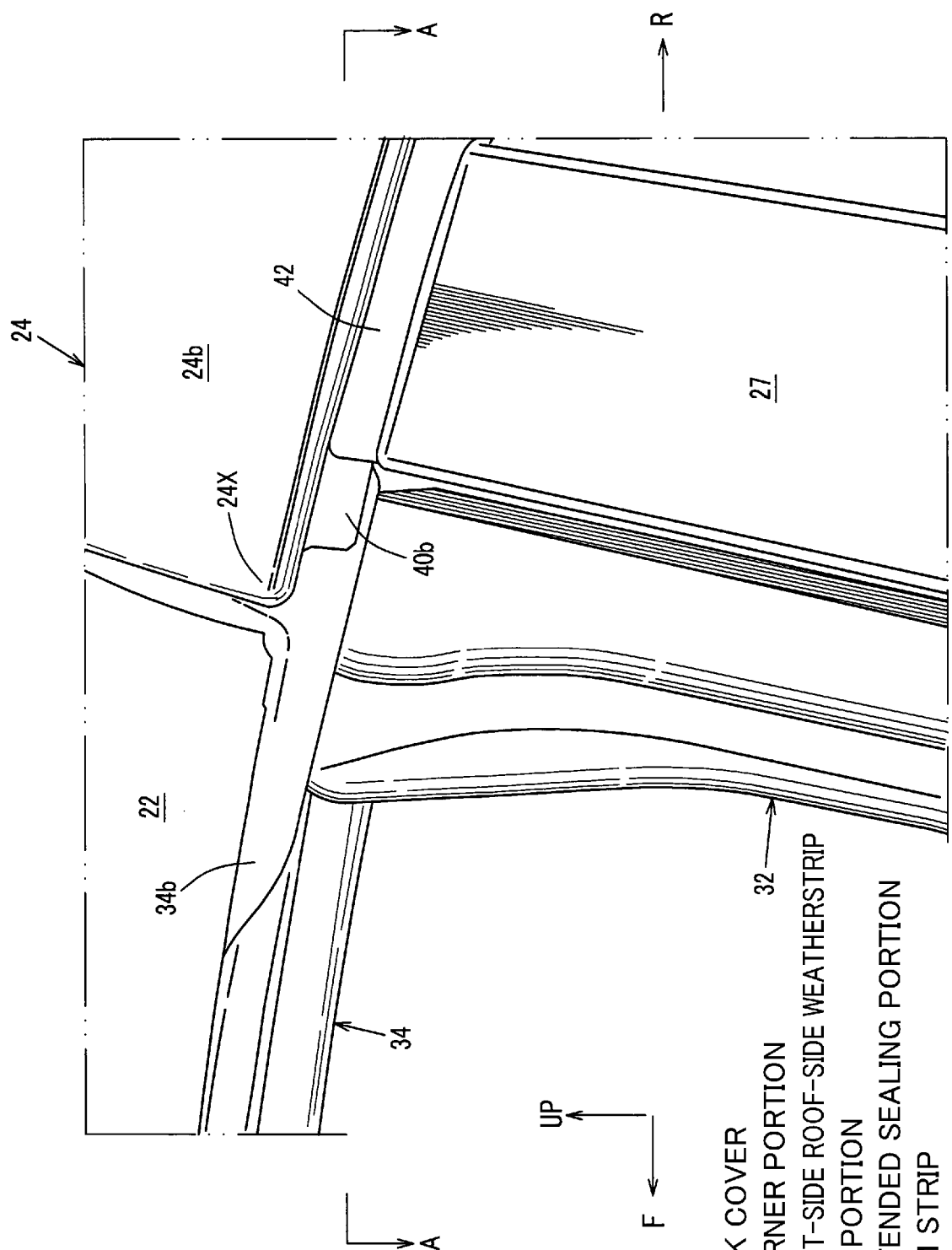
FIG. 5 A partial enlarged side view of FIG. 2.
Figure 6:
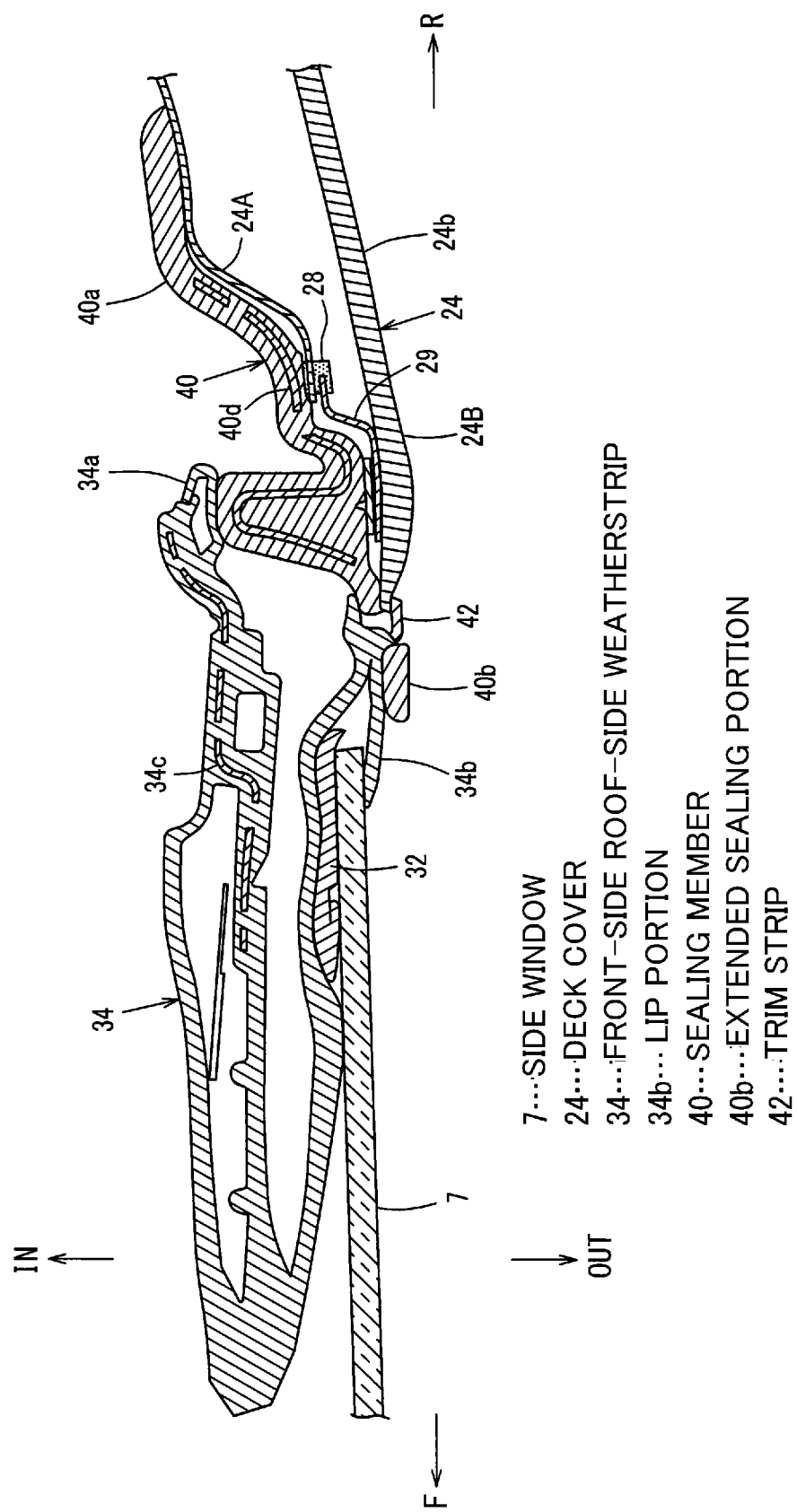
FIG. 6 A cross-sectional view taken along line A-A shown in FIG. 5.
Figure 7:
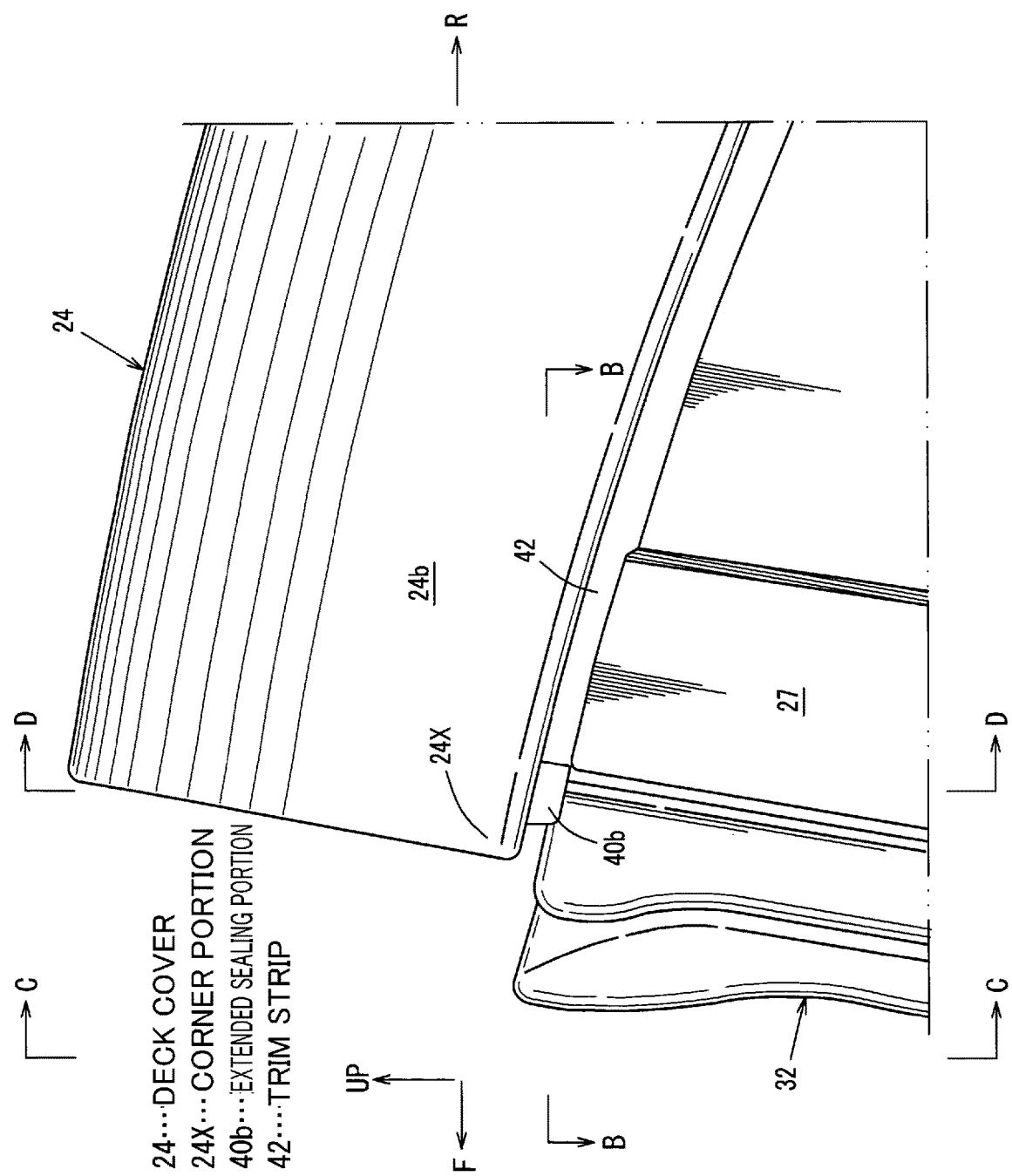
FIG. 7 A partial enlarged side view of FIG. 1.
Figure 8:
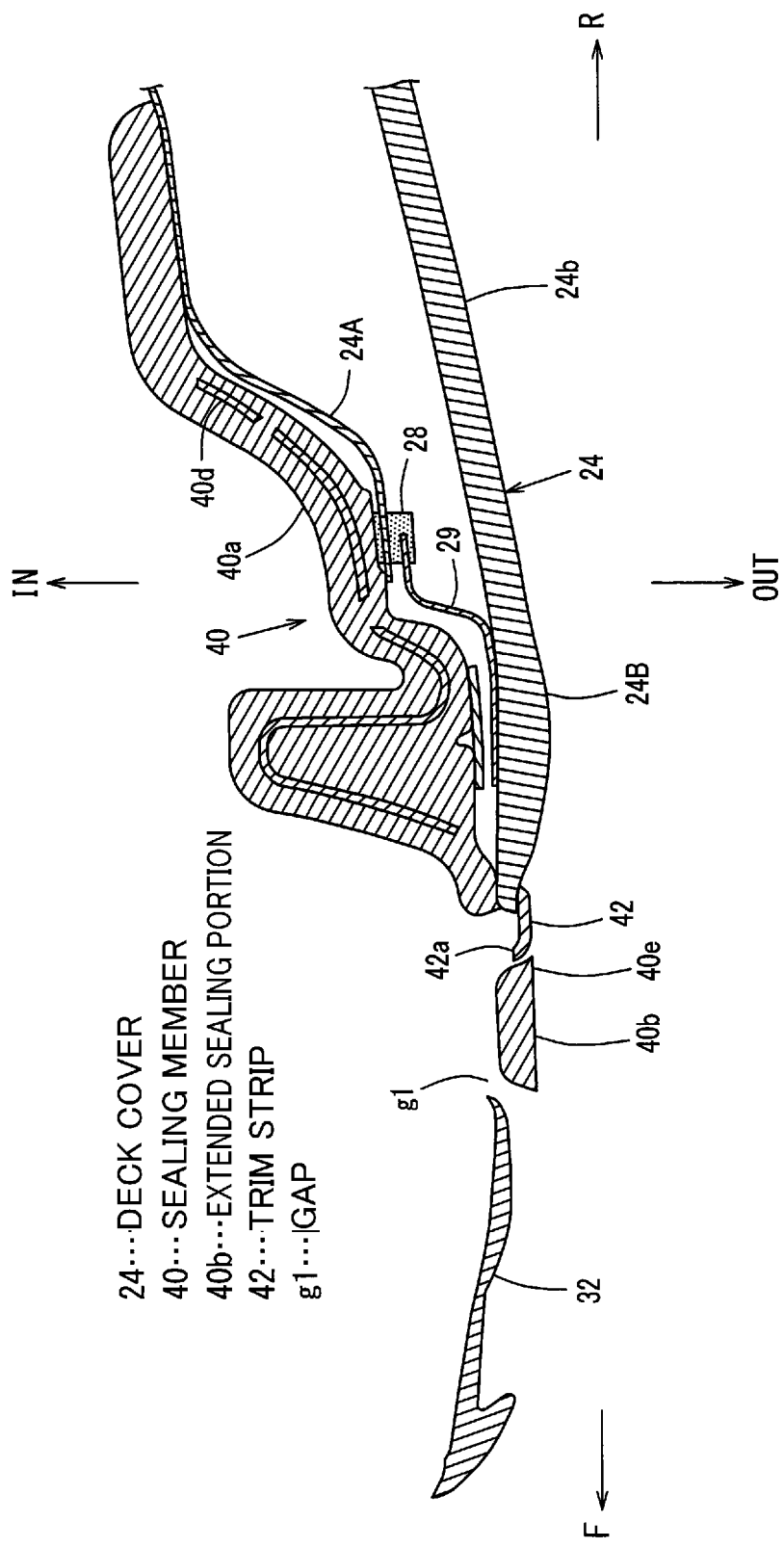
FIG. 8 A cross-sectional view taken along line B-B shown in FIG. 7.
Figure 9:
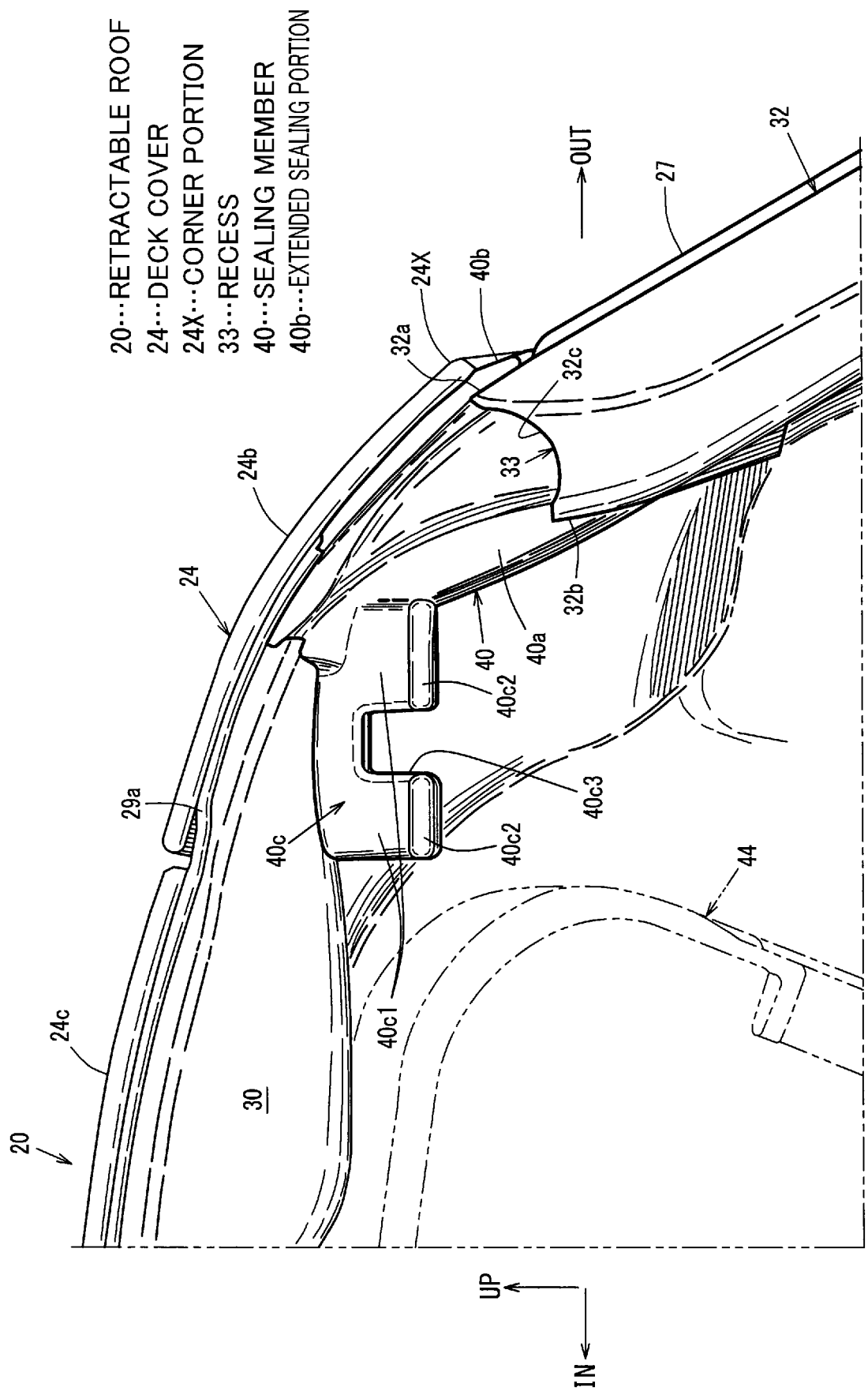
FIG. 9 A view viewed along line C-C shown in FIG. 7.
Figure 10:
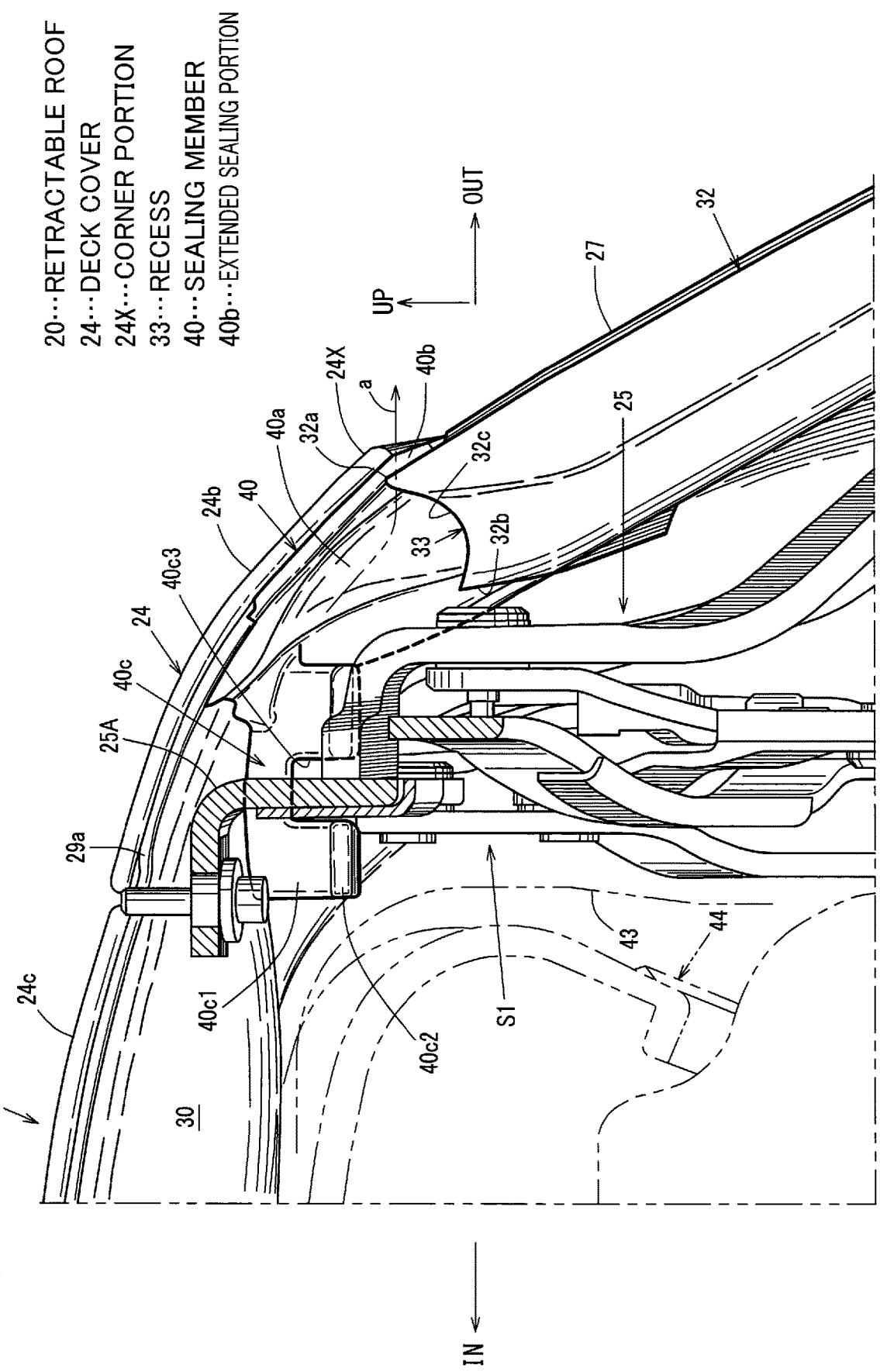
FIG. 10 A view obtained by incorporating a linkage into FIG. 9.
Figure 11:
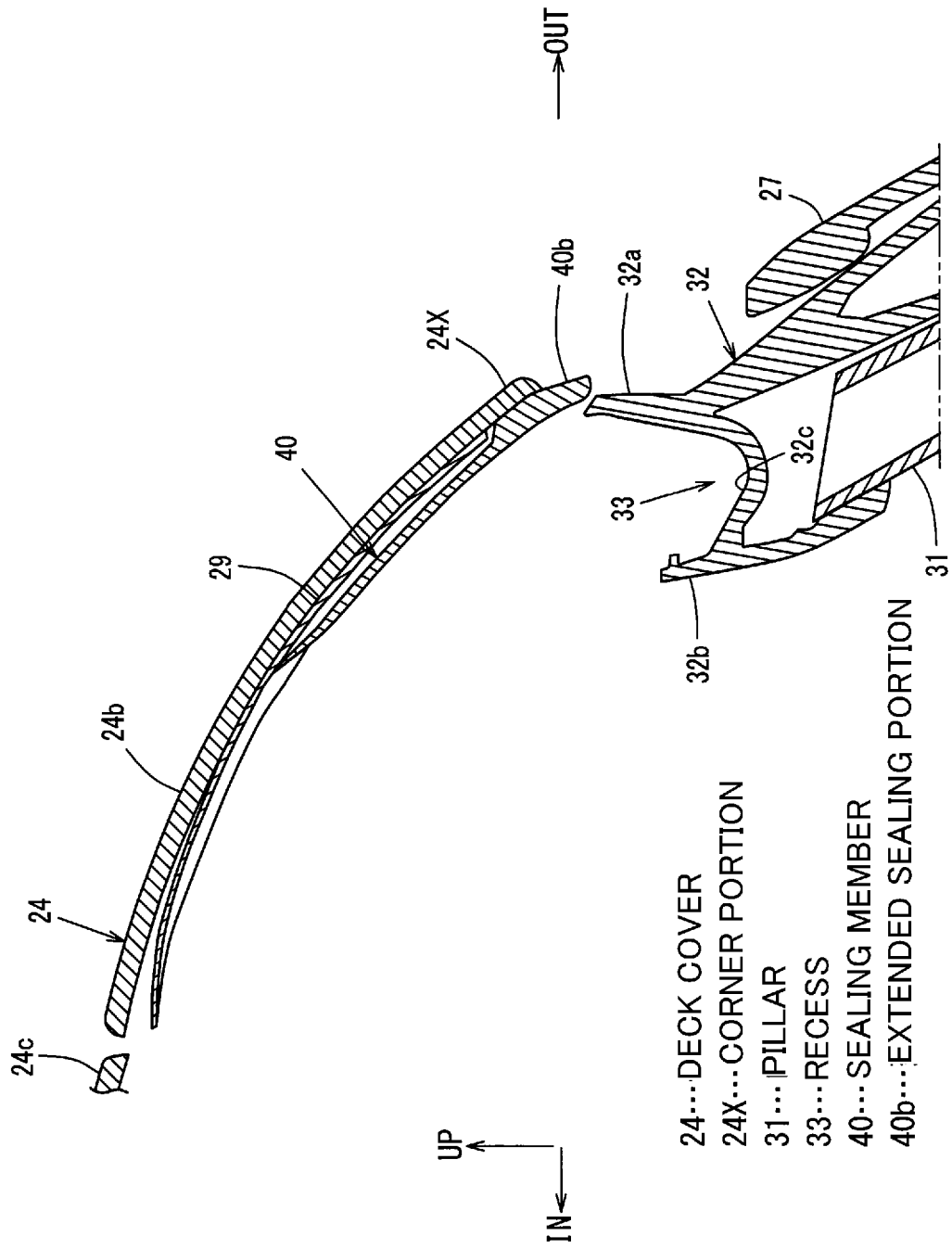
FIG. 11 A cross-sectional view taken along line D-D shown in FIG. 7.

FIG. 5 is a partial enlarged side view of FIG. 2. FIG. 6 is a cross-sectional view taken along line A-A shown in FIG. 5. FIG. 7 is a partial enlarged side view of FIG. 1. FIG. 8 is a cross-sectional view taken along line B-B shown in FIG. 7. FIG. 9 is a view viewed along line C-C shown in FIG. 7. FIG. 10 is a view obtained by incorporating a linkage into FIG. 9. FIG. 11 is a cross-sectional view taken along line D-D shown in FIG. 7. FIG. 12 is a side view showing an entering wind prevention structure on the right side of the vehicle. A portion (a) of FIG. 13 is a front view of a sealing member, and a portion (b) of FIG. 13 is a right side view of the sealing member.

As illustrated in FIGS. 6, 8, 12, and 13, to form the portions 24a, 24b, and 24c, the deck cover 24 includes a deck cover inner portion 24A, and a deck cover outer portion 24B that is thicker than the deck cover inner portion 24A and is made of a resin. As illustrated in FIGS. 6 and 8, the deck cover inner portion 24A and the deck cover outer portion 24B are connected together through a sealing member 28 and a bracket 29 at a front upper portion of the deck cover 24. In addition, as illustrated in FIG. 12, a front end portion of the deck cover 24 has a hemmed portion 29a obtained by hemming the bracket 29 and the deck cover inner portion 24A.

As illustrated in FIGS. 9, 10, and 12, the deck cover inner portion 24A is provided with a step portion 30 that is integral therewith. The step portion 30 is provided behind a portion of the deck cover 24 in contact with the middle roof 22 and protrudes downward and rearward.

As illustrated in FIGS. 2 and 4, the side windows 7 are respectively provided in front of the side surfaces of the deck cover 24 as the rear-side roof. As illustrated in FIG. 4, corner portions 24X of an upper edge portion of the deck cover 24 close to the associated side windows 7 each protrude toward the front of the vehicle beyond a rear frame portion of the associated side window 7 (a rear portion of a frame of the side window including the associated front pillar 3, the front roof 21, the middle roof 22, and a pillar 31 described below).

As illustrated in FIGS. 1 and 2, the pillars 31 are each disposed on the associated corner portion 24X inside the vehicle. The pillars 31 are provided on the vehicle body to extend in an up-and-down direction. The pillars 31 are each provided with a pillar-side weatherstrip 32.

As illustrated in FIGS. 9, 10, and 11, an upper portion of the pillar-side weatherstrip 32 has a recess 33 extending in the longitudinal direction of the vehicle and defined by an outer piece 32a, an inner piece 32b, and a bottom piece 32c. The recess 33 is configured to receive the retractable roof 20.

On the other hand, as illustrated in FIGS. 5 and 6, front-side roof-side weatherstrips 34 are each attached to a lower portion of an associated one of outer portions, in the vehicle width direction, of the middle roof 22 as a component of the front-side roof 23. As illustrated in FIG. 5, each front-side roof-side weatherstrip 34 is provided along the lower portion of the middle roof 22. As illustrated in FIG. 6, the roof-side weatherstrip 34 includes a sealing portion 34a configured to come into contact with a sealing member 40 so as to achieve sealing, while the roof is closed, and a lip portion 34b positioned to cover the pillar-side weatherstrip 32 on the upper end portion of the pillar 31 and the side window 7 from the outside of the vehicle. Core materials 34c are each provided inside a portion of the roof-side weatherstrip 34 where the core material 34c is needed.

As illustrated in FIGS. 10 and 12, the sealing member 40 is attached to the corner portion 24X of the deck cover 24 inside the vehicle, more specifically, the deck cover inner portion 24A corresponding to a front upper portion of the protruding portion 24b, using a plurality of attachment members 39, 39.

As illustrated in the portions (a) and (b) of FIG. 13, the sealing member 40 includes a sealing member body 40a, an extended sealing portion 40b, and a return portion 40c. The extended sealing portion 40b extends from an upper portion of the outer surface of the sealing member body 40a in the vehicle width direction while being curved along the shape of the inner surface of the protruding portion 24b, and as illustrated in FIG. 8, blocks a large portion of a gap g1 formed between the corner portion 24X and the pillar-side weatherstrip 32 and intended for the lip portion 34b with the front-side roof 23 open (retracted). As illustrated in FIG. 12, the return portion 40c extends toward the interior of the vehicle cabin and the front of the vehicle from a region spaced rearward from the rear edge of the opening 1, and returns the travel wind toward the front of the vehicle.

As illustrated in FIGS. 6, 8, and 13, core materials 40d are provided inside the sealing member body 40a of the sealing member 40. As illustrated in FIG. 6, while the roof is closed, the extended sealing portion 40b of the sealing member 40 is positioned to sandwich the lip portion 34b of the front-side roof-side weatherstrip 34 between the extended sealing portion 40b and the pillar-side weatherstrip 32.

As can be seen, the extended sealing portion 40b is provided to block the gap g1 from a portion of the sealing member 40 inside the vehicle, more specifically, to block a major portion of the gap g1 formed between the corner portion 24X and the pillar-side weatherstrip 32 and intended for the lip portion 34b while leaving the other portion of the gap g1 unsealed. This prevents wind suction sound (noise) arising from the air stream flowing along a side surface of the vehicle body. In addition, the extended sealing portion 40b extending from the inside of the vehicle pushes the lip portion 34b during closure of the roof as illustrated in FIG. 6. This helps positioning the lip portion.

Incidentally, in the absence of the above-described extended sealing portion 40b, as indicated by the arrow a shown in FIG. 10, the air stream flowing along a side surface of the vehicle body causes suction of wind, thus generating suction sound (noise). However, providing the extended sealing portion 40b prevents such suction sound.

Further, as illustrated in FIGS. 5 to 8, a trim strip 42 is provided on the rear frame portion of the side window 7 outside the vehicle, specifically, the upper, rear, and lower edges of the garnish 27. Note that the trim strip 42 is not shown in FIGS. 1 to 4. As illustrated in FIGS. 6 and 8, a front end portion of the trim strip 42 and the rear edge of the extended sealing portion 40b engages with each other while overlapping each other with the front end portion of the trim strip located inside the rear edge of the extended sealing portion.

That is to say, as illustrated in FIGS. 6 and 8, the front end portion of the trim strip 42 is formed in the shape of a hook oriented inward in the vehicle width direction to form a hook-shaped portion 42a, and the rear end of an outer portion of the extended sealing portion 40b in the vehicle width direction is integrated with a locking piece 40e that locks the hook-shaped portion 42a. Engagement between the hook-shaped portion 42a and the locking piece 40e allows the two portions 40b and 42 to engage with each other.

As can be seen, a surface of the extended sealing portion 40b closer to the inside of the vehicle and a surface of the trim strip 42 closer to the outside of the vehicle engage with each other while overlapping each other in the inside-to-outside direction along the vehicle width direction. This improves the persistence of the positioning accuracy without rigidifying the extended sealing portion 40b, such as providing core materials in the extended sealing portion 40b.

More specifically, even if the extended sealing portion 40b and the trim strip 42 are each formed of a flexible member, these flexible members (the extended sealing portion 40b and the trim strip 42), which have high durability in the tensile direction, pull each other toward an associated attachment region (an associated one of the inside and outside of the vehicle cabin), thereby improving the persistence of the positioning accuracy.

As illustrated in FIG. 12, the return portion 40c is provided to extend toward the inside of the vehicle cabin and the front of the vehicle from a region spaced from the rear edge of the opening 1, i.e., the front edge of the deck cover 24, toward the rear of the vehicle, and return the travel wind toward the front of the vehicle. While the roof is open, most of the travel wind flowing from the front of the vehicle toward the rear of the vehicle passes along the outer surface of the deck cover 24, and flows toward the rear of the vehicle as indicated by the arrow b shown in FIG. 12. However, part of the travel wind flows through the corner portion 24X as a corner portion of the deck cover 24 into the inside of the deck cover 24 as indicated by the arrow c shown in FIG. 12.

The travel wind that has flowed through the opening 1 into the vehicle cabin is returned to the front of the vehicle at the return portion 40c. Since the travel wind temporarily entering the vehicle cabin is returned to the front of the vehicle as indicated by the arrow C shown in FIG. 12, the wind in front of the return portion has its pressure increased. This prevents pulsing sound, and reduces resonance.

As illustrated in FIG. 10, the retractable roof 20 is driven through the linkage 25 to open and close. Both lateral side portions of a space between the retractable roof 20 and the storage compartment 26 in the vehicle width direction each have a space S1 where the linkage 25 is disposed. FIG. 10 illustrates only a left side portion of the vehicle.

The return portion 40c is disposed to be adjacent to this space S1.

As indicated by the phantom curves shown in FIG. 10, an interior material 43 such as a trim is provided to be closer to the inside of the vehicle cabin than the linkage 25 is. The interior material 43 is retracted together with the linkage 25 when the front roof 21 and the middle roof 22 are retracted.

As illustrated in FIGS. 9, 10, 12, and 13, the return portion 40c includes a pair of right and left vertical pieces 40c1 and horizontal pieces 40c2. The pair of vertical pieces 40c1 extend from a region spaced rearward of the rear edge of the opening 1 toward the inside of the vehicle cabin. The horizontal pieces 40c2 extend from the lower ends of the respective vertical pieces 40c1 toward the front of the vehicle. The return portion 40c has a substantial L-shape in a side view as illustrated in FIG. 12, and has an arch shape as illustrated in FIG. 10 when the vehicle is viewed from the front.

An opening 40c3 is formed between the pair of right and left vertical pieces 40c1 and between the horizontal pieces 40c2. The opening 40c3 avoids one link 25A (see FIG. 10) included in the linkage 25 at an intermediate portion of the return portion 40c in the vehicle width direction.

Further, as illustrated in FIG. 12, the return portion 40c includes the step portion 30 provided rearward of the front end of a portion of the deck cover 24 in contact with the middle roof 22, i.e., the upper portion of the deck cover 24, to protrude downward, and a portion of the sealing member 40 provided on a lower portion of the step portion 30 and serving as a return member.

Meanwhile, reference numeral 44 shown in FIGS. 9 and 10 denotes a rear window portion, which includes a rear window pane. The rear window portion 44 moves together with the front roof 21 and the middle roof 22, and is retracted together with the front-side roof 23 when the front-side roof 23 (see FIGS. 2 and 4) is retracted.

Note that in the drawings, the arrow F is directed to the front of the vehicle, the arrow R is directed to the rear of the vehicle, the arrow IN is directed to the inside of the vehicle in the vehicle width direction, the arrow OUT is directed to the outside of the vehicle in the vehicle width direction, and the arrow UP is directed to the upper side of the vehicle.

As can be seen, a sealing structure for a motor vehicle with a retractable roof according to the embodiment is a sealing structure for a motor vehicle with a retractable roof 20 including a front-side roof 23 and a rear-side roof (see a deck cover 24), the motor vehicle having a cabin that has an upper end opened and closed by the retractable roof 20. Side windows 7 are provided in front of respective side surfaces of the rear-side roof (the deck cover 24). Corner portions 24X of an upper edge of the rear-side roof (the deck cover 24) close to the side windows each protrude toward a front of the vehicle beyond a rear frame portion of an associated one of the side windows 7. Pillars 31 provided on a vehicle body are positioned on the respective corner portions 24X inside the vehicle. Front-side roof-side weatherstrips 34 attached to the front-side roof 23 each include a lip portion 34b, the lip portion 34b being positioned to cover an upper end portion of an associated one of the pillars 31 from outside of the vehicle while the roof is closed. Sealing members 40 are respectively provided on the corner portions 24X of the rear-side roof (the deck cover 24) close to the side windows inside the vehicle. An extended sealing portion 40b extends from each sealing member 40, the extended sealing portion 40b blocking a gap g1 while the front-side roof 23 is open, the gap g1 being formed between an associated one of the corner portions 24X and an associated one of the pillars 31 (specifically, the pillar-side weatherstrips 32) and intended for the lip portion 34b. The extended sealing portion 40b is positioned to sandwich the lip portion 34b of the front-side roof-side weatherstrip 34 between the extended sealing portion 40b and the pillar 31 (see the pillar-side weatherstrip 32) while the roof is closed (see FIGS. 2, 6, 8, and 12).

According to this configuration, the extended sealing portion 40b is provided to block a major portion of the gap g1 from the sealing member 40 inside the vehicle. Thus, the extended sealing portion 40b blocking the major portion of the gap g1 can prevent wind suction sound (noise) arising from the air stream flowing along a side surface of the vehicle body. In addition, the extended sealing portion 40b extending from the inside of the vehicle pushes the lip portion 34b while the roof is closed. This helps position the lip portion.

In one embodiment of the present invention, the trim strip 42 is provided on the rear frame portion of the side window 7 outside the vehicle, and the front end portion of the trim strip 42 and the rear edge of the extended sealing portion 40b engage with each other while overlapping each other in the inside-to-outside direction of the vehicle cabin (see FIGS. 6 and 8).

According to this configuration, the extended sealing portion 40b inside the vehicle and the trim strip 42 outside the vehicle engage with each other while overlapping each other in the inside-to-outside direction. This can improve the persistence of the positioning accuracy without rigidifying the extended sealing portion 40b, such as providing a core material in the extended sealing portion 40b.

More specifically, even though the extended sealing portion 40b and the trim strip 42 are each formed of a flexible member, these flexible members, which have high durability in the tensile direction, pull each other toward the associated attachment region (an associated one of the inside and outside of the vehicle cabin), thereby improving the persistence of the positioning accuracy.

Furthermore, in one embodiment of the present invention, an upper portion of each of the pillars 31 (more specifically, see the pillar-side weatherstrips 32) has a recess 33 receiving the retractable roof 20 and extending in the longitudinal direction of the vehicle (see FIGS. 11 and 12).

This configuration allows the recess 33 to support the retractable roof 20 on the upper portion of the associated pillar 31 without misalignment, and can effectively prevent wind flowing in the direction of the gap g1 along the recess 33 (the pillar recess) from causing suction sound. That is to say, the retractable roof 20 can be supported, and suction sound can be prevented.

In the correspondence between components of the present invention and those of the foregoing embodiment, the rear-side roof of the present invention corresponds to the deck cover 24 of the embodiment. However, components of the foregoing embodiment are merely examples of the present invention.

For example, in the foregoing embodiment, the front roof 21 and the middle roof 22 form the front-side roof 23. However, the front-side roof 23 may include only the front roof.

The extended sealing portion 40b is configured to block a major portion of the gap g1. However, this configuration is merely an example of the present invention. The extended sealing portion 40b may block the entire gap g1.

INDUSTRIAL APPLICABILITY

As can be seen from the foregoing description, the present invention is useful for a sealing structure for a motor vehicle with a retractable roof including a front-side roof and a rear-side roof. The motor vehicle has a cabin that has its upper end opened and closed by the retractable roof.

DESCRIPTION OF REFERENCE CHARACTERS

7 . . . Side Window
20 . . . Retractable Roof
23 . . . Front-Side Roof
24 . . . Deck Cover (Rear-Side Roof)
24X . . . Corner Portion
31 . . . Pillar
33 . . . Recess
34 . . . Front-Side Roof-Side Weatherstrip
34b . . . Lip Portion
40 . . . Sealing Member
40b . . . Extended Sealing Portion
42 . . . Trim Strip
g1 . . . Gap

The invention claimed is:

1. A sealing structure for a motor vehicle with a retractable roof including a front-side roof and a rear-side roof, the motor vehicle having a cabin that has an upper end opened and closed by the retractable roof, wherein
side windows are provided in front of respective side surfaces of the rear-side roof, corner portions of an upper edge of the rear-side roof close to the side windows each protrude toward a front of the vehicle beyond a rear frame portion of an associated one of the side windows,
pillars provided on a vehicle body are positioned on the respective corner portions inside the vehicle,
front-side roof-side weatherstrips attached to the front-side roof each include a lip portion, the lip portion being positioned to cover an upper end portion of an associated one of the pillars from outside of the vehicle while the roof is closed,
sealing members are respectively provided on the corner portions of the rear-side roof close to the side windows inside the vehicle,
an extended sealing portion extends from each sealing member, the extended sealing portion blocking a gap while the front-side roof is open, the gap being formed between an associated one of the corner portions and an associated one of the pillars and intended for the lip portion, and
the extended sealing portion is positioned to sandwich the lip portion of the front-side roof-side weatherstrip between the extended sealing portion and the pillar while the roof is closed.

2. The sealing structure of claim 1, wherein
a trim strip is provided on the rear frame portion of each of the side windows outside the vehicle, and a front end portion of the trim strip and a rear edge of the extended sealing portion engage with each other while overlapping each other with the front end portion of the trim strip located inside the rear edge of the extended sealing portion.

3. The sealing structure of claim 1 or 2, wherein
an upper portion of each of the pillars has a recess receiving the retractable roof and extending in a longitudinal direction of the vehicle.

4. The sealing structure of claim 2, wherein
an upper portion of each of the pillars has a recess receiving the retractable roof and extending in a longitudinal direction of the vehicle.

* * * * *